(12) United States Patent
Wu et al.

(10) Patent No.: US 12,539,353 B2
(45) Date of Patent: Feb. 3, 2026

(54) EFFICIENT BIPHASIC CALCIUM PHOSPHATE COATING METHOD

(71) Applicant: HANGZHOU HUIBO SCIENCE AND TECHNOLOGY CO., LTD, Zhejiang (CN)

(72) Inventors: Gang Wu, Zhejiang (CN); Liyong Wu, Zhejiang (CN); Yunyu Lu, Zhejiang (CN)

(73) Assignee: HANGZHOU HUIBO SCIENCE AND TECHNOLOGY CO., LTD, Hangzhou (CN)

( * ) Notice: Subject to any disclaimer, the term of this patent is extended or adjusted under 35 U.S.C. 154(b) by 342 days.

(21) Appl. No.: 18/249,044

(22) PCT Filed: Apr. 1, 2021

(86) PCT No.: PCT/CN2021/084852
§ 371 (c)(1),
(2) Date: Apr. 13, 2023

(87) PCT Pub. No.: WO2022/205279
PCT Pub. Date: Oct. 6, 2022

(65) Prior Publication Data
US 2024/0016978 A1   Jan. 18, 2024

(30) Foreign Application Priority Data
Mar. 29, 2021 (CN) .......................... 202110330084.5

(51) Int. Cl.
A61L 27/32 (2006.01)
A61L 27/06 (2006.01)

(52) U.S. Cl.
CPC .............. *A61L 27/32* (2013.01); *A61L 27/06* (2013.01); *A61L 2420/02* (2013.01); *A61L 2430/02* (2013.01)

(58) Field of Classification Search
None
See application file for complete search history.

(56) References Cited

U.S. PATENT DOCUMENTS

| | | | |
|---|---|---|---|
| 6,720,023 B1* | 4/2004 | Kim | A61L 27/32 |
| | | | 427/2.27 |
| 2003/0113438 A1 | 6/2003 | Liu et al. | |
| 2005/0170070 A1 | 8/2005 | Layrolle et al. | |
| 2008/0097618 A1 | 4/2008 | Baker et al. | |

FOREIGN PATENT DOCUMENTS

| | | | |
|---|---|---|---|
| CN | 101342387 A | 1/2009 | |
| CN | 102633497 A | 8/2012 | |

OTHER PUBLICATIONS

Chow, L., "Solubility of Calcium Phosphates," Octacalcium Phosphate, Monogr Oral Sci. Basel, Karger, Chow, LC, Eames, ED (eds.), 18: 94-111 (2001). (Year: 2001).*
Li, F et al., "A simple biomimetic method for calcium phosphate coating", Surface and Coatings Technology, vol. vol. 154, No. 1, May 1, 2018 (May 1, 2018), pp. 88-93.
Liu, Yuelian et al., "Biomimetic coprecipitation of calcium phosphate and bovine serum albumin on titanium alloy", Journal of Biomedical Materials Research, vol. 57, No. 3, Dec. 5, 2001 (Dec. 5, 2001), pp. 327-335.
Liu, Yuelian et al., "The kinetics and mechanism of bone morphogenetic protein 2 release from calcium phosphate-based implant-coatings", Journal of Biomedical Materials Research Part A, vol. 106A, No. 9, Sep. 30, 2018 (Sep. 30, 2018), pp. 2363-2371.
Pamela Habibovic et al., "Biological performance of uncoated and octacalcium phosphate-coated Ti6Al4V", Biomaterials, vol. 26, No. 1, Jan. 1, 2005 (Jan. 1, 2005), pp. 23-36.

* cited by examiner

*Primary Examiner* — David J Blanchard
*Assistant Examiner* — Daniel F Coughlin
(74) *Attorney, Agent, or Firm* — MUNCY, GEISSLER, OLDS & LOWE, P.C.

(57) ABSTRACT

An efficient biphasic calcium phosphate coating method. A high-concentration (4.5×) supersaturated calcium phosphate solution (SCPS) is used for coating and a thicker continuous coating is formed on a titanium disc. The coating contains dicalcium phosphate dihydrate and hydroxyapatite. The coating has improved encapsulation efficiency of a protein FITC-BSA and releases less $Ca^{2+}$ under an acidic condition. A more efficient coating with a high yield and a protein encapsulation efficiency can be obtained with a less SCPS solution volume and a shorter coating time, such that a cost is greatly reduced in clinical application and the coating is very expected to be used in an osteogenic implant material in the biomedical field.

11 Claims, 10 Drawing Sheets

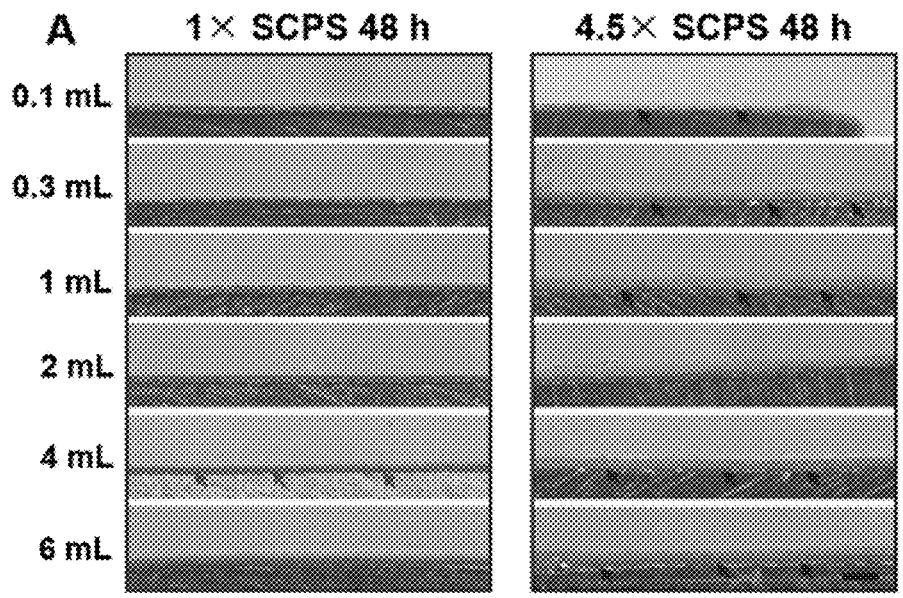
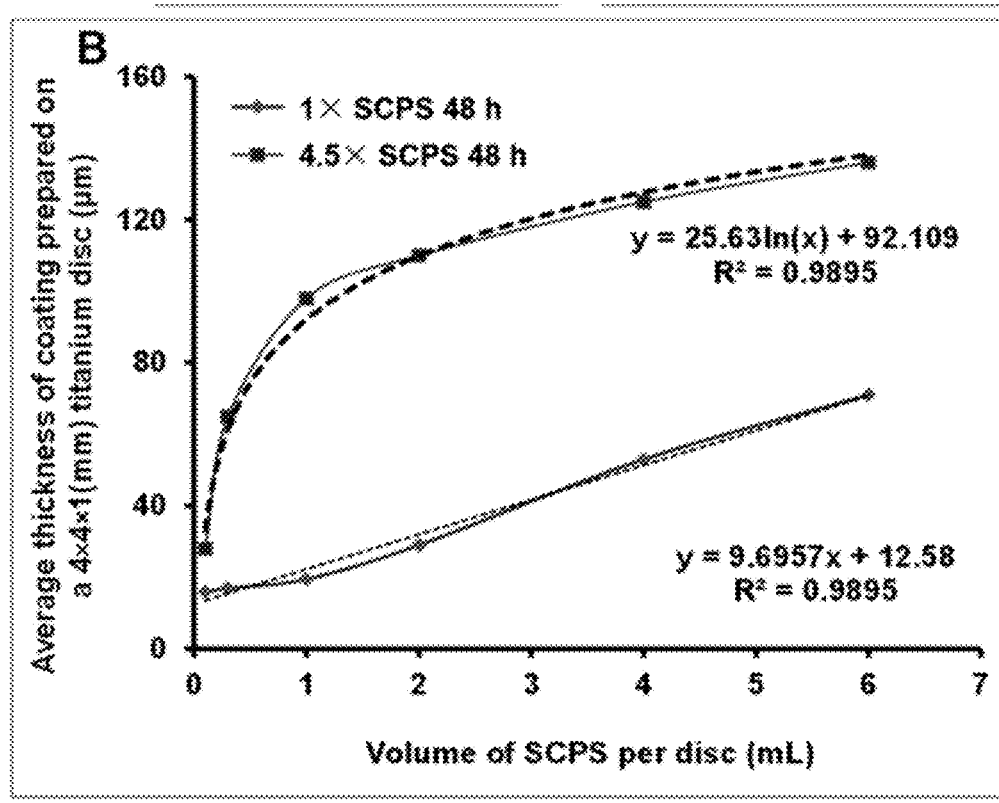
FIG.1A
FIG.1B

EFFICIENT BIPHASIC CALCIUM PHOSPHATE COATING METHOD

BACKGROUND OF THE INVENTION

Field of the Invention

The present disclosure belongs to the field of preparation of biological coating materials, in particular to a high-efficiency biphasic calcium phosphate coating method with a high yield and a protein encapsulation efficiency.

Brief Description of the Related Art

Titanium and titanium alloys have been used in the fields of human hard tissue implants such as artificial joints, fracture fixators, etc. due to excellent characteristics in mechanical performances, biocompatibility, and corrosion resistance. However, after the titanium and titanium alloys are directly implanted into a human body, since the titanium and an oxide film naturally formed on a surface are biologically inert, they are difficult to form a connection with a tissue and promote a formation of a new bone on the surface in an early stage of implantation, thereby showing problems of a low binding force with bones, a poor bioactivity, a long healing time, etc. To solve these problems, it is effective to perform a biologically active coating treatment on the surface thereof.

A calcium phosphate (CaP) coating, also known as a biphasic calcium phosphate coating, is a most widely used surface modification method to promote an osteointegration ability and an osteoconductivity of an endosteal implant and a bone defect filling material due to an osteoid composition, a good biocompatibility, and an ability to regulate various osteogenic processes. At present, there are two main methods for preparing a CaP coating: 1) a physical deposition technology and 2) a wet chemical technology. The physical deposition technology comprises various thermal processes such as a vacuum plasma spraying and a suspension plasma spraying. A main limitation of the physical deposition technology is that a non-physiological coating condition (>1,000° C.) makes it impossible to incorporate a biologically active substance capable of promoting osteogenesis. Therefore, it is a new trend to develop a new wet chemical deposition technology to prepare a bioactive CaP coating in the field of biomaterial research.

A biomimetic coating technology was originally proposed in the 90s of the 20th century. A biomaterial is immersed in a simulated body fluid (SBF) with an ionic concentration, a pH value, and a temperature close to that of human body plasma, and thus a dense, uniform, and typically low-crystallinity apatite can be formed. This physiological condition enables a large amount of the biologically active substances to co-precipitate with a biomimetic coating and retains their biological activity. However, an implementation of an initial biomimetic coating process is limited due to its time consuming (typically 14 days) and dependence on a functional group nucleation of the biomaterial. Taset et al. successfully accelerated a coating process significantly to several hours by increasing an SBF concentration by 10 times (10×SBF). However, a problem of SBF deposition depending on biomaterial functional groups remains unsolved.

In 2000, professor Klaas and coworkers developed a biphasic biomimetic coating method: 1) an amorphous CaP base layer was formed by incubation in a 5×SBF solution followed by incubation in a supersaturated calcium phosphate solution (SCPS) to form a CaP crystalline layer. This biphasic biomimetic method can form a CaP crystal coating within 3 days. In addition, such coating can be used in a variety of biomaterials with different three-dimensional geometries, surface structures, and surface chemical properties, such as metals (titanium alloys), inorganic materials (TCP and Bio Oss), and polymeric materials (naturally derived collagen and synthetic poly lactic-co-glycolic acid). The wide applicability of such biomimetic coating is largely attributable to the amorphous CaP base layer, which can form a mechanical interlocking mechanism rather than a chemical reaction with reactive chemical groups. The amorphous CaP layer is necessary for growth of the subsequent CaP crystalline layer. The CaP crystalline layer can be used for coprecipitation, loading, and slow release of various biologically active substances, in particular an osteoinductive growth factor, a bone morphogenetic protein 2 (BMP-2). An osteogenic induction efficiency of the BMP-2 added to the coating is significantly improved compared to the BMP-2 adsorbed by a surface, which may be related to a controlled release characteristic of the coating.

However, since an ion concentration of the SCPS is relatively low, an encapsulation efficiency of expensive biologically active substances is relatively low (about 21%), which prevents use of the coating in the biomedical field. Yu et al. attempted to increase the encapsulation efficiency to 90% using only 1 ml of m-SBF by adjusting a ratio of a matrix surface area to a volume of a modified SBF (m-SBF). However, they do not report a final coating thickness, and the certain thickness of the coating is very important to store a sufficient amount of biologically active medicines and to ensure adequate administration time to support bone formation.

Therefore, it is urgent to find a biphasic calcium phosphate (Cap) coating method with higher yield and protein encapsulation efficiency, a higher coating efficiency, a thicker thickness, and a better effect, thereby meeting a requirement of the biomedical field on the biologically active coating of a biological material implanted in a bone.

SUMMARY OF THE INVENTION

In order to solve existing problems in the prior art, the present disclosure provides an efficient biphasic calcium phosphate coating method with high yield and protein encapsulation efficiency. A high-concentration (4.5×) super-saturated calcium phosphate solution (SCPS) is used for coating and a thicker continuous coating is formed on a titanium disc. Besides, the coating contains dicalcium phosphate dihydrate and hydroxyapatite. The coating has an obviously improved encapsulation efficiency of a fluorescently-labeled model protein FITC-BSA and releases less $Ca^{2+}$ under an acidic condition. The improved coating process provided by the present disclosure can obtain an osteogenic implant material very expected to be used in the biomedical field with a thicker coating and a higher encapsulation efficiency of biologically active substances by a less SCPS solution volume and a shorter coating time.

On the one hand, the present disclosure provides a biphasic calcium phosphate coating, wherein the coating contains dicalcium phosphate dihydrate (DCPD) and hydroxyapatite.

The biphasic calcium phosphate coating provided by the present disclosure is a complex of DCPD and hydroxyapatite. The DCPD has biocompatibility, biodegradability, and osteoconductivity, and can be converted into dicalcium phosphate anhydrous (DCPA) (pH<6), octacalcium phosphate (OCP) (pH=6-7) or precipitated hydroxyapatite (pHAp) (pH>7). In medicine, the DCPD can be used in the preparation of a calcium phosphate (CaP) bone cement. Studies find that the DCPD can be converted to hydroxyapatite in vivo and can be degraded and replaced by a bone.

The coating containing the DCPD and hydroxyapatite provided by the present disclosure has a firmer structure, deposits more bionic calcium phosphate (CaP), can carry more active proteins, has an acid resistance for resisting osteoclastic resorption, releases less $Ca^{2+}$ under an acidic condition, is more slowly degraded in vivo, and has an obviously better performance than a coating only containing the hydroxyapatite.

On the other hand, the present disclosure provides a preparation method, comprising the following steps:
(1) immersing a titanium disc into a 5× simulated body fluid (SBF) to prepare a CaP base layer; and
(2) taking out, drying, and immersing the base layer in a SCPS at a concentration of 1 time or more.

The preparation of the biphasic calcium phosphate coating provided by the present disclosure mainly uses the SCPS with a higher concentration to perform coating, thereby realizing an improvement of a coating effect.

Further, in step (2), the SCPS at a concentration of 1 time or more is 4.5×SCPS.

The 5×SBF in the present disclosure refers to the SBF with a concentration of 5 times; the 4.5×SCPS refers to the SCPS with a concentration of 4.5 times; and the 1×SCPS refers to the SCPS with a concentration of 1 time.

The inventors have surprisingly found through a large amount of researches and experiments that the efficient biphasic calcium phosphate coating with high yield and protein encapsulation efficiency can be realized by coating with the SCPS with a higher concentration, especially with the 4.5×SCPS. Besides, the coating is a complex of the DCPD and hydroxyapatite, and firmer, releases less $Ca^{2+}$ under an acidic condition, degrades more slowly in vivo, and has a coating effect obviously superior to that of the 1×SCPS.

Further, inorganic ion compositions of the 5×SBF, the 1×SCPS, and the 4.5×SCPS are shown in the following table:

| (mM) | $Na^+$ | $Ca^{2+}$ | $Mg^{2+}$ | $Cl^-$ | $HPO_4^{2-}$ | $HCO_3^-$ | pH | Temperature |
|---|---|---|---|---|---|---|---|---|
| 5 × SBF | 715.0 | 12.5 | 7.5 | 724.0 | 5.0 | 21.0 | 6.0 | 37° C. |
| 1 × SCPS | 140.0 | 4.0 | — | 184.0 | 2.0 | — | 7.4 | 37° C. |
| 4.5 × SCPS | 630.0 | 18.0 | — | 828.0 | 9.0 | — | 6.2 | Room temperature |

Further, in step (2), the base layer is taken out, dried, immersed in the 4.5×SCPS, and incubated at room temperature for 5 h or more.

Further, in step (1), the titanium disc is immersed into the 5×SBF and incubated at 37° C. for 24 h to prepare the CaP base layer.

The CaP base layer is an amorphous CaP, can be used for coprecipitation, loading, and slow release of various biologically active substances, is necessary for growth of the subsequent CaP crystalline layer, and can provide a crystallizing nuclei for formation of a subsequent crystal.

Further, the titanium disc has a length and a width of 4 mm and a thickness of 1 mm.

Further, in step (2), the 4.5×SCPS has a volume of 0.1-6 ml.

Studies have proved that the volume of the 4.5×SCPS is in two different relationships with a coating thickness. When the volume of the 4.5×SCPS is in a range of 0.1-1 ml, the coating thickness increases rapidly. When the volume of the 4.5×SCPS increases to 1 ml or more, especially when the solution volume is relatively high (2-6 ml), the coating thickness increases relatively slow.

When the volume of the 4.5×SCPS is 0.1 ml, the coating with a clear crystal structure can be obtained, and the amorphous CaP cannot be observed by a field emission scanning electron microscope. 0.3 ml of the 4.5×SCPS can form a continuous coating and 1 ml of the 4.5×SCPS can already form a very thick coating. It can be seen that the coating with a higher performance can be achieved with a less volume with the 4.5×SCPS.

On the other hand, the present disclosure provides use of 4.5×SCPS in preparing a biphasic calcium phosphate coating, wherein the biphasic calcium phosphate coating contains dicalcium phosphate dihydrate and hydroxyapatite.

On the other hand, the present disclosure provides use of 4.5×SCPS in improving one or more of a yield, a protein encapsulation efficiency, and a coating thickness of a biphasic calcium phosphate coating.

The present disclosure has the following beneficial effects:
(1) The biphasic calcium phosphate coating with higher yield and higher protein encapsulation efficiency and a thicker coating thickness is prepared from the 4.5× SCPS. The quality and the yield of the coating are both obviously improved.
(2) The 4.5×SCPS can realize the coating with a higher performance using a less solution volume. The reduction of the volume can greatly reduce use amount of expensive active ingredients for promoting bone growth, such as a growth factor, etc., so as to greatly reduce a cost in a clinical application.
(3) The prepared coating is a complex of DCPD and hydroxyapatite, has a firmer structure, deposits more bionic CaP, can carry more active proteins, has an acid resistance for resisting an osteoclastic resorption, releases less $Ca^{2+}$ under an acidic condition, is more slowly degraded in vivo, and has an obviously better performance than a coating only containing the hydroxyapatite.

BRIEF DESCRIPTION OF THE DRAWINGS

FIGS. 1A-1B show detection results of thicknesses of coatings on a titanium disc in example 4, wherein FIG. 1A shows microscopic images under a light microscope showing cross-sectional CaP crystal coatings after incubation of the titanium disc in 0.1, 0.3, 1, 2, 4, and 6 mL of 1×SCPS and 4.5×SCPS respectively for 48 h; and FIG. 1B shows a quantitative analysis of a relationship between a volume of a SCPS and an average coating thickness measured by a point counting method; and Bars=200 μm;

FIG. 3A-3B show results of detected pH values of solutions and $Ca^{2+}$ levels in solutions in example 6, wherein FIG. 3A shows the pH values in 1×SCPS and 4.5×SCPS during a coating preparation; and FIG. 3B shows changes of $Ca^{2+}$ along with time; and *, compared with a previous time point; p<0.05;

FIG. 4A-4B show EDS analysis results of 1×SCPS and 4.5×SCPS coatings in example 7, wherein FIG. 4A is an EDS energy spectrum analysis of surface CaP crystalline coatings of titanium discs containing amorphous CaP coatings after incubation in the 1×SCPS or 4.5×SCPS for 48 h; and FIG. 4B is a calcium-phosphorus ratio calculated by analyzing data using EDS;

DETAILED DESCRIPTION OF THE INVENTION

Figure 2:
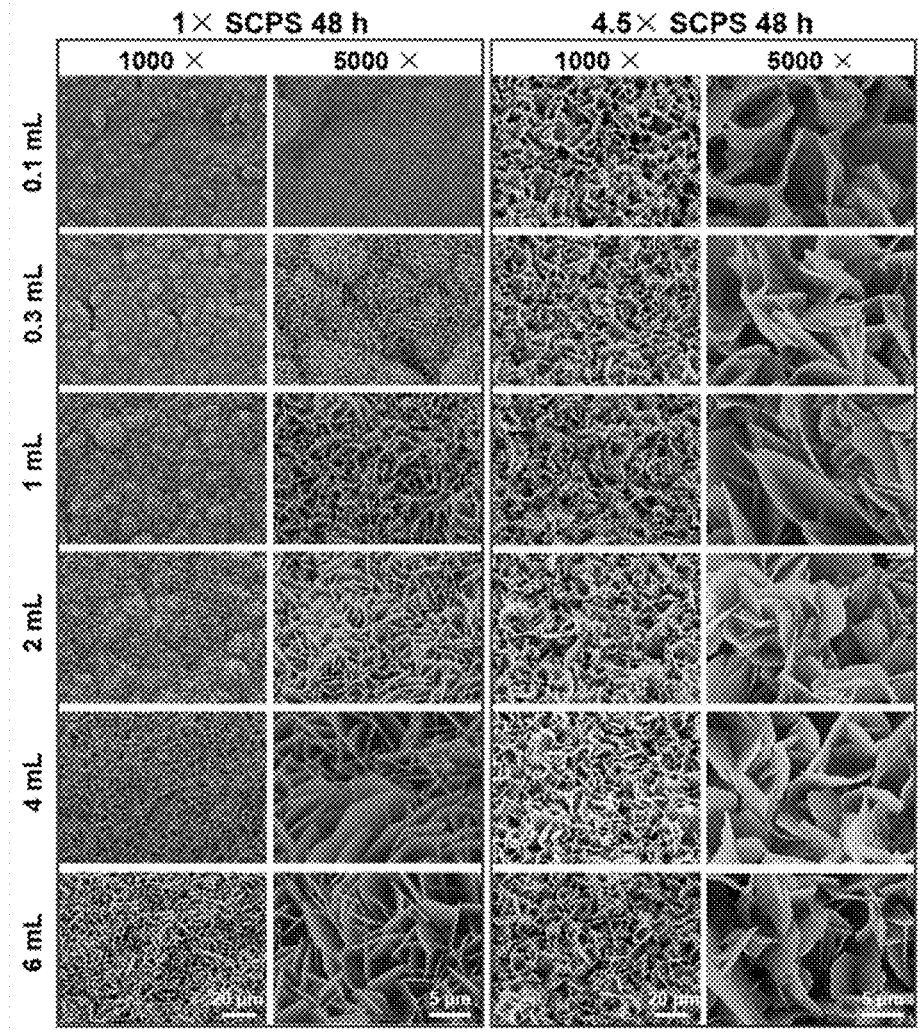
FIG. 2 shows field emission scanning electron microscope (FESEM) images of morphologies of biomimetic CaP coatings prepared from 4.5×SCPS and 1×SCPS, respectively observed at a low magnification (1,000×) and a high magnification (5,000×) in example 5, wherein Bar=20 μm shows images under a low power lens and Bar=5 μm shows images under a high power lens.

The present disclosure is further described in detail below with reference to the accompanying drawings and examples. It should be pointed out that the following examples are intended to facilitate the understanding of the present disclosure without any limitation.

Example 1 Coating by 1×SCPS

In the present example, 1×SCPS was used for coating. Specific steps were as follows:
(1) a 5×SBF and a 1×SCPS were respectively prepared;
(2) a titanium disc with a length and a width of 4 mm and a thickness of 1 mm was taken, immersed in the 5×SBF, and incubated at 37° C. for 24 h to prepare a thin layer amorphous CaP (ACP) base layer; and
(3) the base layer was taken out and dried, and the titanium disc containing the ACP coating was soaked in 1×SCPS at 37° C., wherein a volume of the solution for immersing the titanium disc was 1 ml and incubation time was 24 h; and
the titanium disc of the 1×SCPS coating was obtained.

Example 2 Coating by 4.5×SCPS

In the present example, 4.5×SCPS was used for coating. Specific steps were as follows:
(1) a 5×SBF and a 4.5×SCPS were respectively prepared;
(2) a titanium disc with a length and a width of 4 mm and a thickness of 1 mm was taken, immersed in the 5×SBF, and incubated at 37° C. for 24 h to prepare a thin layer amorphous CaP (ACP) base layer; and
(3) the base layer was taken out and dried, and the titanium disc containing the ACP coating was soaked in the 4.5×SCPS at room temperature, wherein a volume of the solution for immersing the titanium disc was 1 ml and incubation time was 24 h; and
the titanium disc of the 4.5×SCPS coating was obtained.

Example 3 Coating by 5×SCPS

In the present example, 5×SCPS was used for coating. Specific steps were as follows:
(1) 5×SBF and 5×SCPS were respectively prepared; during preparation of the SCPS, it was found that a pH value must be lowered as a concentration of the SCPS increased in order to maintain a stable saturated state without an immediate precipitation, and when the SCPS was prepared, the pH value was required to be around 5.9 in order to maintain a stable saturated state without an immediate precipitation;
(2) a titanium disc with a length and a width of 4 mm and a thickness of 1 mm was taken, immersed in the 5×SBF, and incubated at 37° C. for 24 h to prepare a thin layer amorphous CaP (ACP) base layer; and
(3) the base layer was taken out and dried, and the titanium disc containing the ACP coating was soaked in the 5×SCPS, wherein a volume of the solution for immersing the titanium disc was 1 ml and incubation time was 24 h.

A study found that if the titanium disc containing the ACP coating was soaked in the 5×SCPS at 37° C. in step (3), precipitation occurred rapidly in the 5×SCPS, but no macroscopic crystalline coating was formed on the titanium disc, mainly since the temperature was high, water evaporation was accelerated, and an ion movement was accelerated. It can be seen that when the temperature was high, a high-concentration solution system was unstable. If the titanium disc containing the ACP coating was soaked in the 5×SCPS at room temperature, although the 5×SCPS solution did not exhibit a significant rapid precipitation, the crystalline coating still forms on the titanium disc. It can be seen that no crystalline coating can be formed with the 5×SCPS either at 37° C. or room temperature.

The reason why the 5×SCPS failed to form a crystalline coating was probably because the amorphous CaP base layer rapidly dissolved in the solution due to an acidity of the SCPS. In the 5×SBF solution, the amorphous CaP coating started at a pH of about 6 and ended at a pH above 8.2, which was far above 5.9, since $CO_2$ releases from the solution.

Compared with the coating prepared using the 4.5×SCPS in example 2, the macroscopic crystalline coating can be repeated prepared on the titanium disc of the amorphous CaP coating using the 4.5×SCPS. The effect was obviously better than that of the 5×SCPS. Therefore, the 5×SCPS failed to form a crystalline coating and the 4.5×SCPS was preferably recommended for coating.

Example 4 Comparison of Preparation Thicknesses of 4.5×SCPS and 1×SCPS Coatings A 1×SCPS coating in the present example was prepared by using the coating prepared by the method provided in example 1, wherein volumes of 1×SCPS for immersing a titanium disc were 0.1, 0.3, 1, 2, 4, and 6 ml respectively. A 4.5×SCPS coating was prepared by using the coating prepared by the method provided in example 2, wherein volumes of 4.5×SCPS for immersing a titanium disc were 0.1, 0.3, 1, 2, 4, and 6 ml respectively.

Thicknesses of the 1×SCPS coating and the 4.5×SCPS coating were compared. A volume dependence of a CaP crystalline layer formed on the titanium disc with a length and a width of 4 mm respectively and a thickness of 1 mm was examined. A detection method of the coating thickness was as follows: a titanium disc was embedded with methyl methacrylate, and a 200-μm thick specimen was cut perpendicularly along a cross section of the titanium disc, stuck on an organic glass holder, ground to 80 further dyed with a 0.1% basic fuchsin, and observed with a cold light source (KL 2500 LCD; Carl Zeiss) of a stereo microscope (Stemi SV6; Carl Zeiss, Jena, Germany) and photographed. A surface area of the coating was measured using a point counting method and an average thickness of the coating was the surface area of the coating divided by a length of a titanium surface of the coating. FIGS. 1A and 1B showed detection results of thicknesses of coatings on a titanium disc, wherein FIG. 1A showed microscopic images under a light microscope showing cross-sectional CaP crystal coatings after incubation of the titanium disc in 0.1, 0.3, 1, 2, 4, and 6 mL of 1×SCPS and 4.5×SCPS respectively for 48 h; and FIG. 1B showed a quantitative analysis of a relationship between a volume of a SCPS and an average coating thickness measured by a point counting method. Bars=200 μm.

It can be seen in FIGS. 1A-1B that in groups 1×SCPS and 4.5×SCPS, a higher SCPS volume produced a higher coating thickness. 0.3 mL of the 4.5×SCPS formed a continuous coating, while 0.3 mL of the 1×SCPS formed a thin and discontinuous coating (FIG. 1A). Coating is a method for promoting osteointegration and also a method for carrying proteins. The discontinuous coating represents an incomplete coating, promotes a reduction of an osteointegration capacity, and carries a low amount of proteins. Furthermore, 1 mL of the 4.5×SCPS has been able to form a very thick coating (about 110 μm), while 1 mL of the 1×SCPS can only form a continuous thin coating (29 μm). Therefore, a coating preparation of the 4.5×SCPS was significantly thicker.

Quantitative data in FIG. 1B showed that a volume of the 1×SCPS was linearly and positively correlated with the coating thickness ($y=9.6957x+12.58$, $R^2=0.9895$) with a correlation coefficient of 0.99. The coating thickness of the group can be increased proportionately by increasing the volume of the 1×SCPS. The volume of the 4.5×SCPS was in two different relationships with the coating thickness. When the volume of the 4.5×SCPS was in a range of 0.1-1 mL, the coating thickness increased rapidly. When the solution volume was relatively high (2-6 mL), the coating thickness increased relatively slowly. The volume of the 4.5×SCPS was in a positive logarithm correlation with the coating thickness ($y=25.63 \ln(x)+92.109$, $R^2=0.9895$) and a correlation coefficient was about 0.99 (FIG. 1B). Meanwhile, it can be seen in FIG. 1B that 6 mL of the 4.5×SCPS produced a coating thickness of 136±7 μm, which was 1.9 times that of 6 mL of 1×SCPS (73±12 μm). It can be seen that the 4.5×SCPS can obtain a thicker coating.

Example 5 Comparison of Morphology Characterization of 4.5×SCPS and 1×SCPS Coatings A 1×SCPS coating in the present example was prepared by using the coating prepared by the method provided in example 1, wherein volumes of 1×SCPS for immersing a titanium disc were 0.1, 0.3, 1, 2, 4, and 6 ml respectively, and incubation time was 48 h. A 4.5×SCPS coating was prepared by using the coating prepared by the method provided in example 2, wherein volumes of 4.5×SCPS for immersing a titanium disc were 0.1, 0.3, 1, 2, 4, and 6 ml respectively, and incubation time was 48 h. Morphologies of the biomimetic CaP coatings prepared from the 4.5×SCPS and the 1×SCPS were respectively observed at a low magnification (1,000×) and a high magnification (5,000×) by using a field emission scanning electron microscope (FESEM, Phillips/FEI XL-30). FESEM images were shown in FIG. 2. Bar=20 μm showed images under a low power lens and Bar=5 μm showed images under a high power lens.

It can be seen from a left figure of FIG. 2 that in the 1×SCPS groups, under 1,000× when the 1×SCPS was 0.1 mL, a spherical or hemispherical morphology was still shown, which was typically amorphous CaP and indicated a very thin crystalline layer. Under 5,000×, when the 1×SCPS was 0.1 mL, a network structure was observed, similar to the biomimetic coating obtained at a lower body surface area ratio. When the volume of the 1×SCPS was increased to 2 mL, an amorphous CaP morphology was still seen. When the 1×SCPS was 1 mL, a typical plate-like crystalline layer began to form and a size increased as the solution volume increased.

The amorphous CaP degraded quickly, had a small thickness of about 100-300 nm, and carried very less proteins. The amorphous CaP in the present application primarily served as a precursor to provide a crystallizing nuclei for formation of a subsequent crystal.

It can be seen that from a right figure of FIG. 2 that in the 4.5×SCPS groups, amorphous CaP was not observed even in 0.1 mL of the 4.5×SCPS, but a crystal structure was clearly visible. After incubation with 1 ml of the 4.5×SCPS, a plate-like crystalline layer increased significantly and presented a rose-like aggregation. Even if the volume of the 4.5×SCPS was subsequently increased to 6 mL, the morphology of the coating did not change further and the crystal structure was very stable.

Example 6 Comparisons of Changes of Solution pH Values and $Ca^{2+}$ Concentrations During Preparation Processes of 4.5×SCPS and 1×SCPS Coatings In the present example, according to a volume-related coating thickness analysis provided in example 6, a coating thickness (73 μm) of 1.5 mL of 4.5×SCPS was similar to a coating thickness produced by 6 mL of 1×SCPS on a single titanium disc (with a length and width of 4 mm and a thickness of 1 mm). Therefore, a 1×SCPS coating in the present example was prepared by using the coating prepared by the method provided in example 1, wherein a volume of 1×SCPS for immersing a titanium disc was 6 ml. A 4.5× SCPS coating was prepared by using the coating prepared by the method provided in example 2, wherein a volume of 4.5×SCPS for immersing a titanium disc was 1.5 ml.

During incubation, pH values of the solution and $Ca^{2+}$ levels in the solution at different time points were measured respectively at different time points. The $Ca^{2+}$ content in the solution was measured using an atomic absorption spectrometer (AAnalyst 100, PerkinElmer, Foster City, CA, USA). Data were presented as mean and standard deviation. Data on changes of the pH values and $Ca^{2+}$ levels were compared using a one-way analysis of variance (ANOVA). A Post-hoc comparison was performed using a Bonferroni correction and a significance level was $p<0.05$.

Figure 3A:
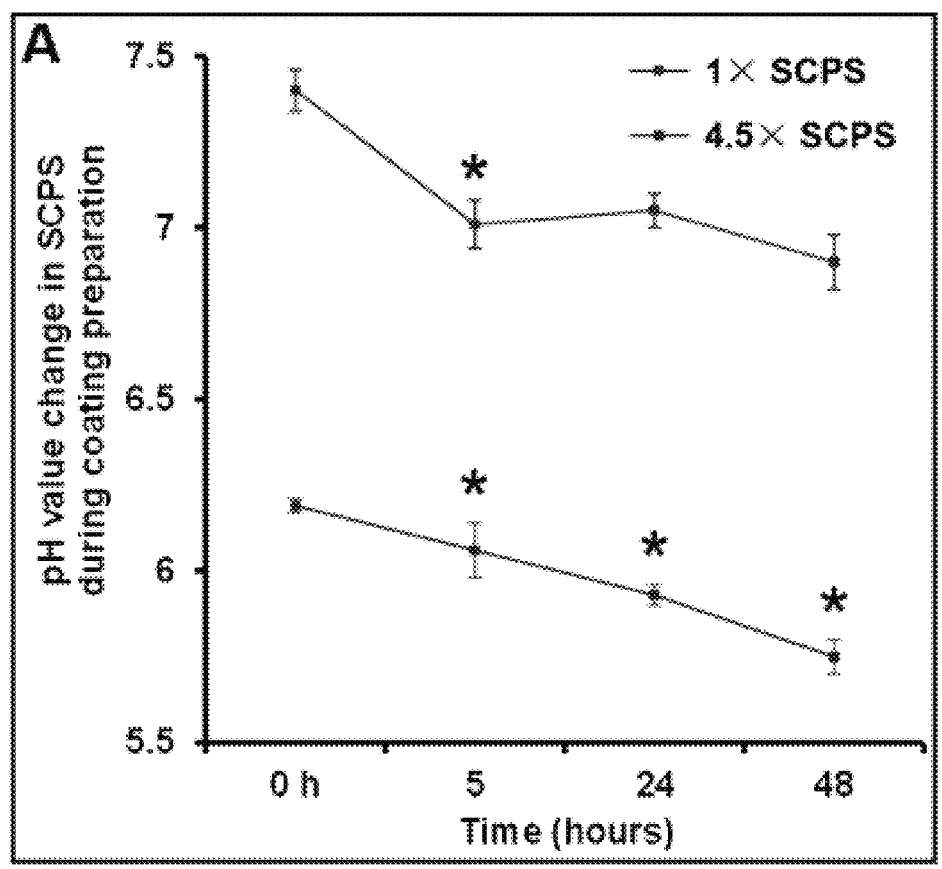
Figure 3B:
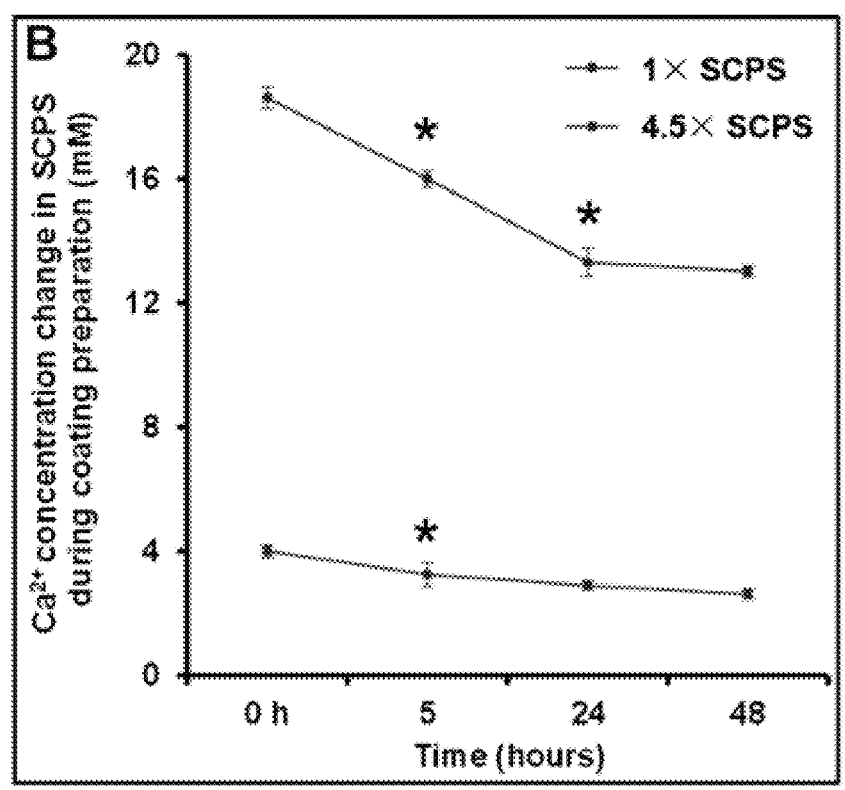

The results were shown in FIGS. 3A and 3B, wherein FIG. 3A showed the pH values of the 1×SCPS and 4.5× SCPS during a coating preparation process. FIG. 3B showed changes of $Ca^{2+}$ along with time; and *, compared with a previous time point; $p<0.05$;

It can be seen from FIG. 3A that compared with the 1×SCPS, an initial pH of the 4.5×SCPS was about 6.2. By using a pH meter, it was found that pH values of both SCPSs decreased over time during the coating preparation process. With regard to 1×SCPS, the pH value dropped significantly from 7.4 to about 7.0 ($p<0.05$) within first 5 hours and continued to remain at this level during a subsequent phase. In contrast, the pH value of the 4.5×SCPS decreased significantly ($p<0.05$) at all time points (5, 24, and 48 h), eventually to about 5.75.

It can be seen from FIG. 3B that similar to a pH change law, the $Ca^{2+}$ concentrations of the 1×SCPS group decreased significantly within 5 h from 4.0 mM to 3.2 mM ($p<0.05$), and gradually to 2.6 mM. About 35% of the $Ca^{2+}$ was consumed at an end of a coating process. With regard to 4.5×SCPS, the $Ca^{2+}$ concentration decreased significantly ($p<0.05$) after 5 h and 24 h of incubation, but subsequently remained stable at about 13 mM, and did not further decrease. About 30% of the $Ca^{2+}$ was consumed at an end of the coating preparation process.

Example 7 Characterization of 4.5×SCPS and 1×SCPS Coatings

A 1×SCPS coating in the present example was prepared by using the coating prepared by the method provided in example 1, wherein a volume of 1×SCPS for immersing a titanium disc was 6 ml. A 4.5×SCPS coating was prepared by using the coating prepared by the method provided in example 2, wherein a volume of 4.5×SCPS for immersing a titanium disc was 1.5 ml. A calcium-phosphorus ratio was calculated by analyzing a relative density of calcium and phosphorus in the coating through EDS. A phase composition was detected by XRD (X'Pert PRO; PANalytical, Malvern, UK) and chemical groups were analyzed by ATR-FTIR. A scanning range of an XRD analysis was 2.00°-80.00°, a scanning speed was 2°/min, and a scanning interval was 0.02°. FTIR (Avatar 360 Nicolet spectrometer; Thermo Fisher Scientific, Waltham, MA, USA) detected by ATR-FTIR was a transmission spectrum with the wavenumber of 4,000 to 400 $cm^{-1}$.

Figure 4A:
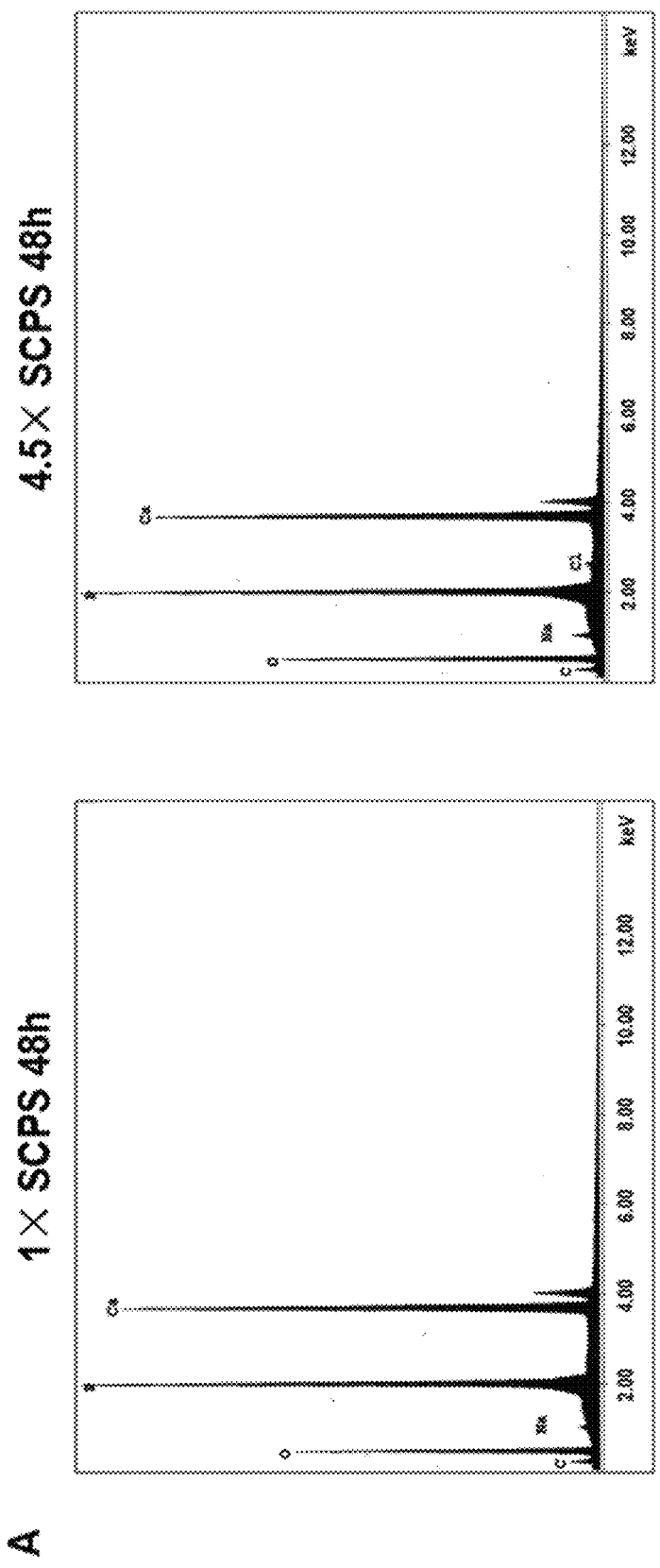
Figure 4B:
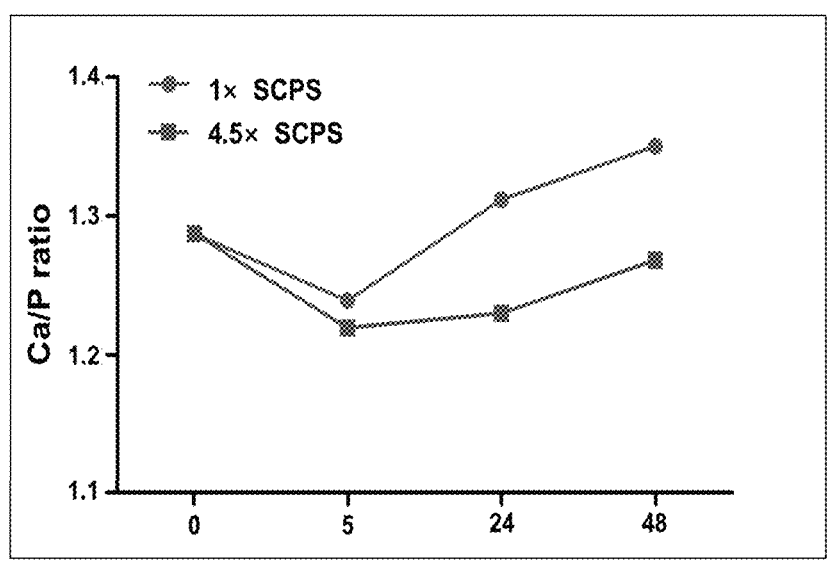

The EDS analysis results were shown in FIGS. 4A and 4B, wherein FIG. 4A was an EDS energy spectrum analysis of surface CaP crystalline coatings of titanium discs containing amorphous CaP coatings after incubation in the 1×SCPS or 4.5×SCPS for 48 h, and FIG. 4B was a calcium-phosphorus ratio calculated by analyzing data using EDS.

It can be seen from FIGS. 4A and 4B that the coatings formed after the titanium discs of 1×SCPS and 4.5×SCPS groups mainly consisted of calcium, phosphorus, and oxygen elements after 48 h of incubation. Ca/P ratios of the coatings also showed a similar change law: the Ca/P ratio firstly decreased and then increased followed within 5 h and the final Ca/P ratios of the 1×SCPS and 4.5×SCPS were 1.35 and 1.26 respectively.

Figure 5A:
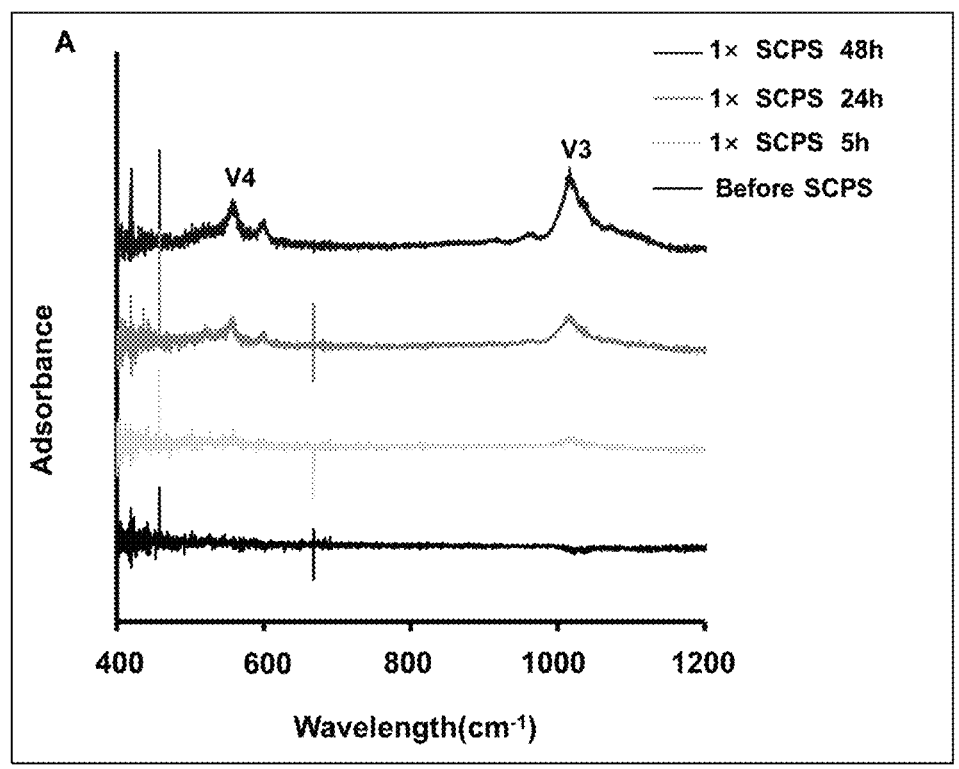
FIG. 5A-5B show attenuated total reflection-fourier transform infrared spectroscopy (ATR-FTIR) analysis spectrums in example 7 to analyze chemical compositions of CaP coatings after incubation of titanium discs containing amorphous CaP coatings in 1×SCPS FIG. 5A or 4.5×SCPS FIG. 5B for 5 h, 24 h, and 48 h.
Figure 5B:
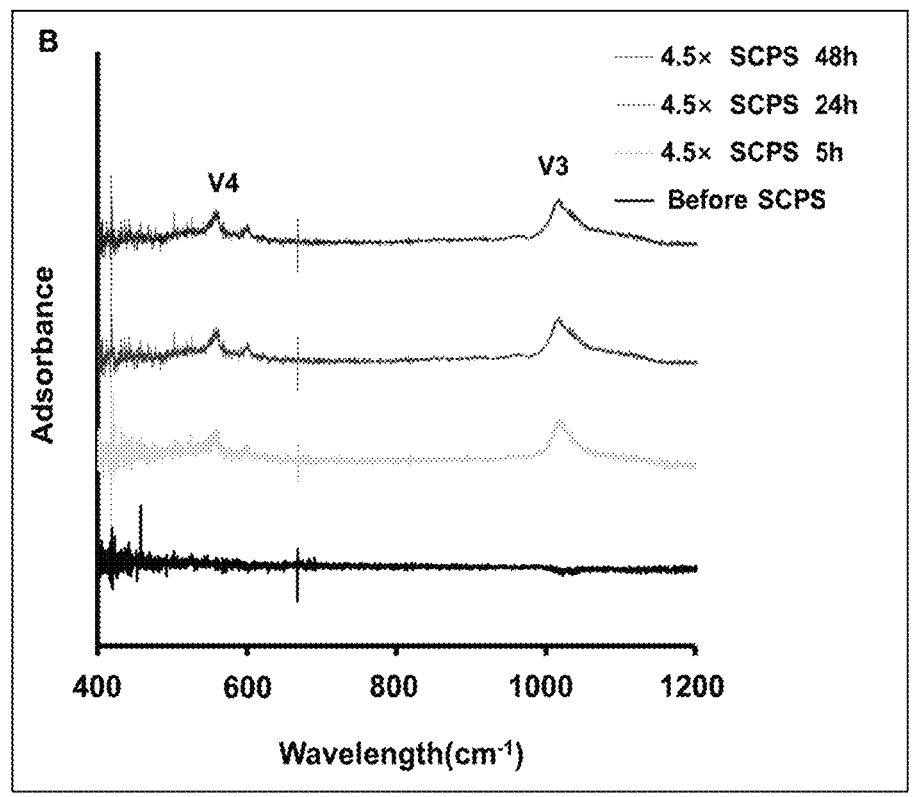

FIG. 5 showed attenuated total reflection-fourier transform infrared spectroscopy (ATR-FTIR) analysis spectrums to analyze chemical compositions of CaP coatings after incubation of the titanium discs containing amorphous CaP coatings in 1×SCPS (FIG. 5A or 4.5×SCPS (FIG. 5B for 5 h, 24 h, and 48 h.

It can be seen from FIGS. 5A and 5B that the ATR-FTIR spectrums showed characteristic peaks $PO_4^{3-}$ for the 1×SCPS and 4.5×SCPS groups at wavelengths of 1,018-1,021 $cm^{-1}$ (v3) and 560 $cm^{-1}$ (v4), indicating that the biomimetic CaP coating was successfully deposited onto the titanium disc. The peaks at 1,018-1,021 $cm^{-1}$ (v3) and 560 $cm^{-1}$ (v4) after the titanium discs of the 1×SCPS group were incubated for 5 h were more pronounced, which was more remarkable with increasing incubation time (FIG. 5A). In contrast, the peak values of the titanium discs of the 4.5× SCPS group after 5 h incubation were significantly more remarkable than those of the 1×SCPS group (FIG. 5B). The characteristic peaks became more remarkable over time, indicating that 5 h of incubation resulted in an obvious crystal coating.

Figure 6A:
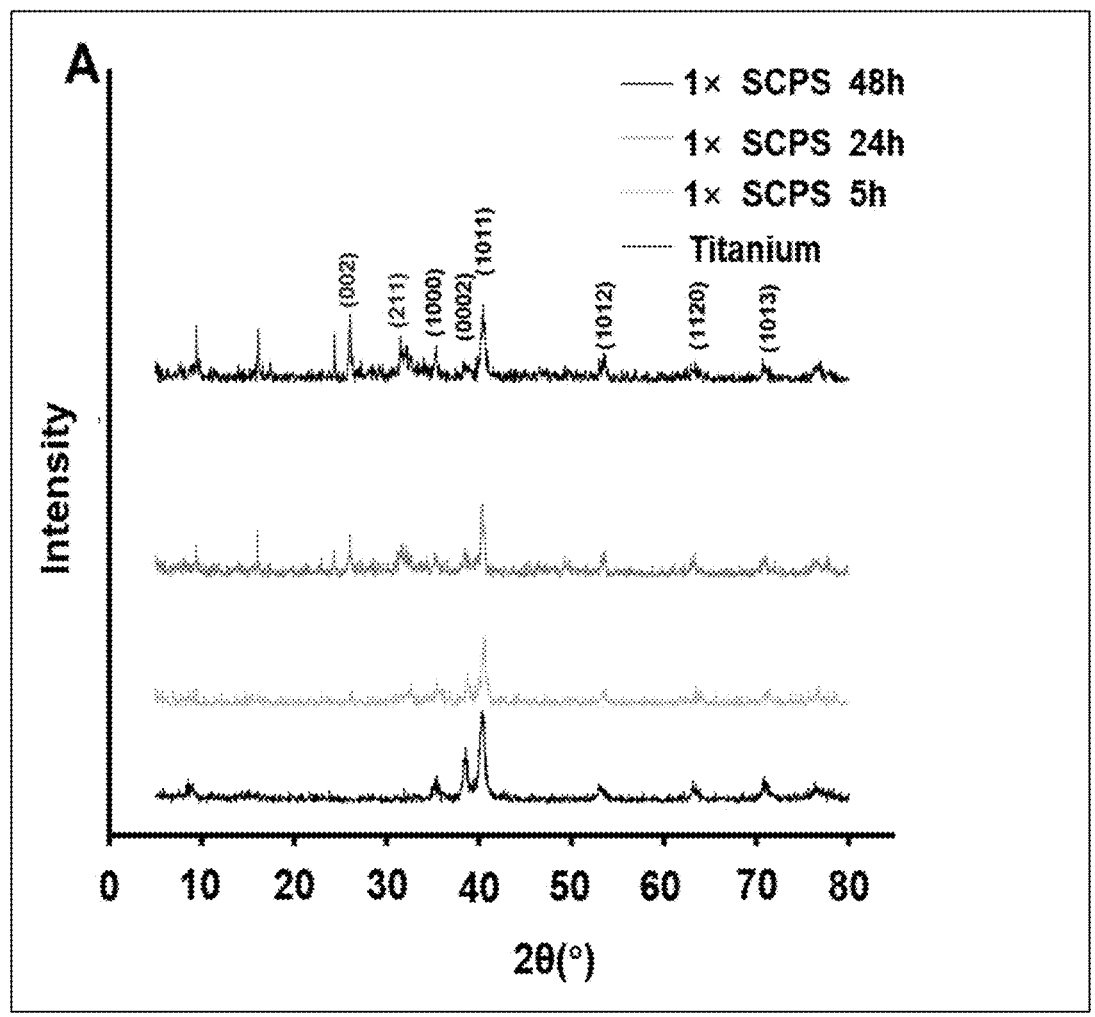
FIG. 6A-6B show x-ray diffraction (XRD) analysis patterns in example 7 analyzing phase compositions of CaP coatings after incubation of titanium discs containing amorphous CaP coatings in 1×SCPS FIG. 6A or 4.5×SCPS FIG. 6B for 5 h, 24 h, and 48 h.
Figure 6B:
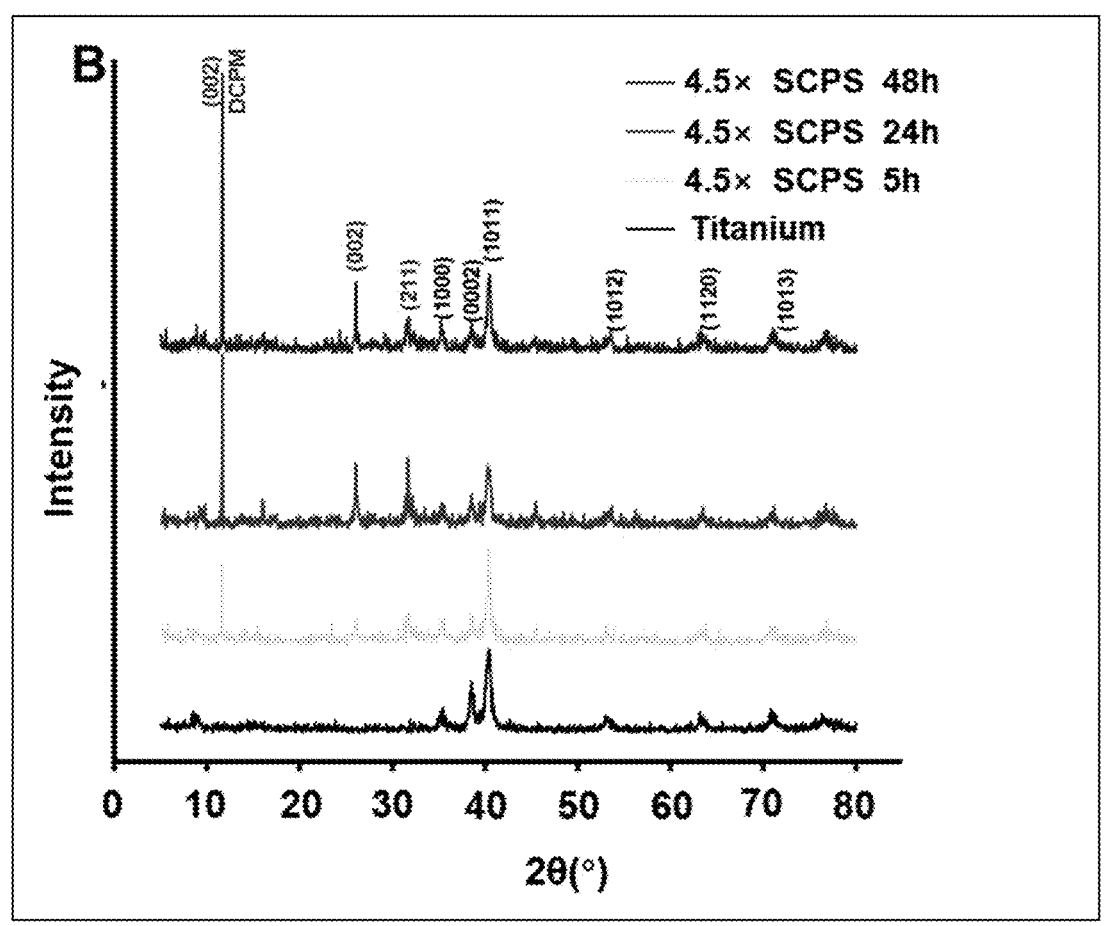

FIGS. 6A and 6B showed x-ray diffraction (XRD) analysis patterns analyzing phase compositions of CaP coatings after incubation of titanium discs containing amorphous CaP coatings in 1×SCPS (FIG. 6A) or 4.5×SCPS (FIG. 6B) for 5 h, 24 h, and 48 h. Characteristic diffraction peaks at $2\theta=35.5°, 38.4°, 40.3°, 53.4°, 63.1°$, and $71.4°$ corresponded to (1000), (0002), (1011), (1012), (1120), and (1013) planes of titanium.

It can be seen from FIG. 6A that the coating formed by incubation of 1×SCPS had two characteristic peaks at $2\theta=26.1°$ and $31.5°$, corresponding to (002) and (211) planes of hydroxyapatite (JCPDS no. 09-0432) respectively. After 5 h incubation in the 1×SCPS, these peaks began to appear and became more remarkable as a coating deposition process proceeded.

Meanwhile, it can be seen from FIG. 6B that the coating formed in the 4.5×SCPS also had two characteristic peaks of the hydroxyapatite. In addition, the coating also presented a very sharp peak at $2\theta=11.7°$ corresponding to dicalcium phosphate dihydrate (DCPD) (JCPDS no. 9-77). These findings indicted that the coating was a complex of the DCPD and the hydroxyapatite. The DCPD has biocompatibility, biodegradability, and osteoconductivity, and can be converted into dicalcium phosphate anhydrous (DCPA) (pH<6), octacalcium phosphate (OCP) (pH=6-7) or precipitated hydroxyapatite (pHAp) (pH>7). In medicine, the DCPD can be used in the preparation of a CaP bone cement. Studies find that the DCPD can be converted to hydroxyapatite in vivo and can be degraded and replaced by a bone.

Example 8 Release Curves of $Ca^{2+}$ in 4.5×SCPS and 1×SCPS Coatings

A 1×SCPS coating in the present example was prepared by using the coating prepared by the method provided in example 1, wherein a volume of 1×SCPS for immersing a titanium disc was 6 ml, and incubation time was 48 h. A 4.5×SCPS coating was prepared by using the coating prepared by the method provided in example 2, wherein a volume of 4.5×SCPS for immersing a titanium disc was 1.5 ml, and incubation time was 48 h.

A method for detecting release curves of $Ca^{2+}$ in the coatings under different pH conditions comprised the following steps: in order to detect release kinetics of $Ca^{2+}$ in both groups of the coatings, the titanium discs containing the coatings were soaked in 0.5 mL of the following buffer: 0.05 M of Tris-HCL (pH=7.424) or 0.1 M of an acetate buffer (pH=6.0 or 4.529) at 60 rpm and incubated at 37° C. At predetermined time points of 4 h, 5 h, 9 h, 1 day, 2 days, 3 days, 5 days, 8 days, 11 days, 14 days, 17 days, 21 days, 27 days, and 35 days, a supernatant was collected and a same volume of a new buffer was added. Finally, after samples were diluted with a lanthanum reagent [0.5 wt % of $La(NO_3)_3 \cdot 6H_2O$ (Merck, Darmstadt, Germany)] in 0.05 M of HCl, the content of $Ca^{2+}$ in the solution was measured using an atomic absorption spectrometer (AAnalyst 100, PerkinElmer, Foster City, CA, USA) and a cumulative release curve was analyzed. Data were expressed as mean and standard deviation. Data on changes of the pH values and $Ca^{2+}$ levels were compared using a one-way analysis of variance (ANOVA). A Post-hoc comparison was performed using a Bonferroni correction. An unpaired t-test was used to compare the total amount of $Ca^{2+}$ released in the same buffer and a significance level was $p<0.05$.

Figure 7:
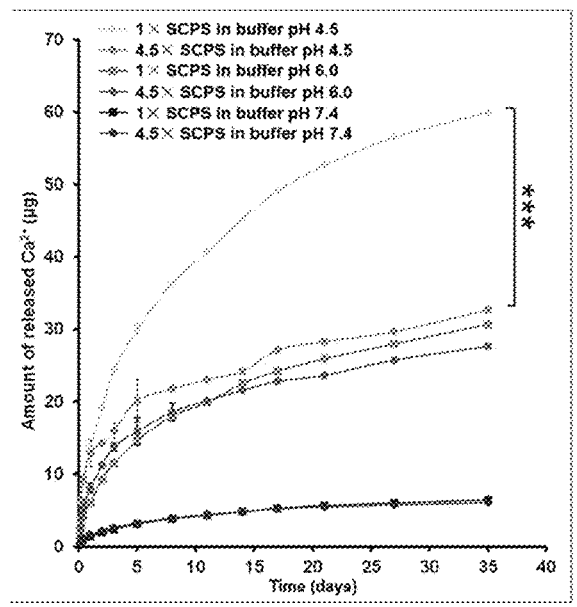
FIG. 7 shows $Ca^{2+}$ release curves in neutral (pH=7.4) and acidic (pH=6.0 and 4.5) buffers of biomimetic CaP coating titanium discs obtained by incubation in 1×SCPS or 4.5× SCPS in example 8, where, *, p<0.001.

FIG. 7 showed $Ca^{2+}$ release curves in neutral (pH=7.4) and acidic (pH=6.0 and 4.5) buffers of biomimetic CaP coating titanium discs obtained by incubation in 1×SCPS or 4.5×SCPS, where, ***, $p<0.001$.

It can be seen from FIG. 7 that an acidic solution was selected to simulate effects of a surgical site (an initial environment may be acidic) and osteoclasts (which degraded bone through an acid secretion). Under a physiological condition, when a pH was 7.4, a release amount of $Ca^{2+}$ was relatively low. The release curves of the $Ca^{2+}$ were the same for both SCPSs with an average release of about 0.17 µg per day. In the buffer at a pH of 6.0, release profiles of both coatings remained substantially the same with an average daily release amount of 0.78 µg. This phenomenon was consistent with a melting curve of a zinc ion from a hydroxyapatite coating. The zinc ion had a higher release rate in an acetate buffer (pH=4.5) and a lower release rate in a phosphate buffered saline. Under a strongly acidic condition (pH=4.5), the total amount of the $Ca^{2+}$ released by the 1×SCPS group (59.95±1.39 µg) was significantly higher than that by the 4.5×SCPS group (32.67±0.03 µg) ($p<0.001$). However, even in a strongly acidic microenvironment, the $Ca^{2+}$ release in the 4.5×SCPS coating did not change significantly, which could be explained by its solid structure and more biomimetic CaP deposited on the titanium disc. A $Ca^{2+}$ dissolving speed in the 1×SCPS group was faster since a free $H^+$ affected nucleation of a structurally loose apatite. This finding indicated that under an acidic condition (pH=4.5), the $Ca^{2+}$ released by the 4.5×SCPS group coating was significantly less than the 1×SCPS group. It can be seen that the biomimetic CaP coating prepared from the 4.5× SCPS had an acid resistance for resisting an osteoclastic resorption, indicating that the coating may degrade slowly in vivo.

Example 9 Comparison of Encapsulation Efficiencies of 4.5×SCPS and 1×SCPS Coatings of Model Protein FITC-BSA According to a volume-related coating thickness analysis provided in example 6, a coating thickness (73 µm) produced by 1.5 mL of 4.5×SCPS was similar to a coating thickness produced by 6 mL of 1×SCPS on a single titanium disc (with a length and width of 4 mm respectively and a thickness of 1 mm). Therefore, the 1×SCPS coating in the present example was prepared by using the coating prepared by the method provided in example 1, wherein a volume of 1×SCPS for immersing a titanium disc was 6 ml. The 4.5×SCPS coating was prepared by using the coating prepared by the method provided in example 2, wherein a volume of 4.5×SCPS for immersing a titanium disc was 1.5 ml.

Figure 8:
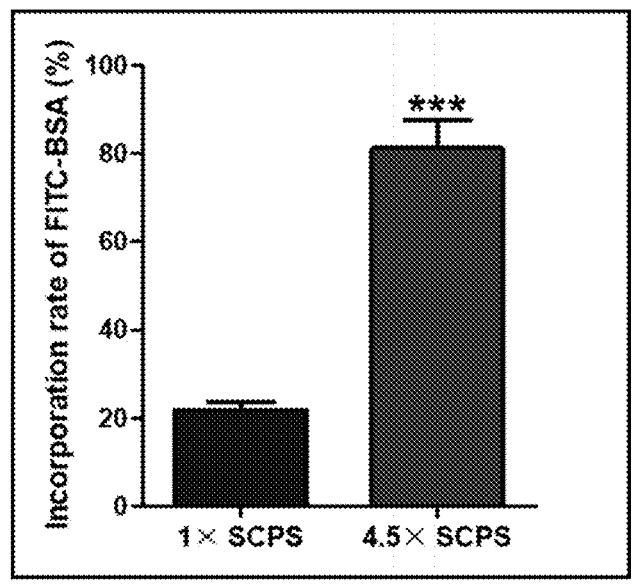
FIG. 8 shows an encapsulation efficiency of fluorescein isothiocyanate-labeled bovine serum albumin (FITC-BSA) as a model protein in coatings of titanium discs in 1×SCPS or 4.5×SCPS groups in example 9, where, *, p<0.001.

Based on previous studies, fluorescein isothiocyanate-labeled bovine serum albumin (FITC-BSA) (5 µg/mL) was used as a model protein. The FITC-BSA was dissolved at a concentration of 5 µg/mL in the 1×SCPS or 4.5×SCPS respectively and incubated for 48 h respectively. After coating, the sample coatings were dissolved in 0.5 mL of 0.5 M EDTA (pH=8.0) and vortexed twice for 5 min each to recover the coated FITC-BSA. A fluorescence intensity was read with a spectrophotometer (an excitation wavelength of 485 nm and an emission wavelength of 519 nm) and a FITC-BSA standard curve was plotted to calculate the FITC-BSA content. An encapsulation efficiency was as follows: embedded FITC-BSA/FITC-BSA was added into FITC-BSA in the SCPS (n=5). FIG. 8 showed the encapsulation efficiency of the model protein FITC-BSA in the coatings of the titanium discs in the 1×SCPS or 4.5×SCPS groups, where, ***, $p<0.001$.

It can be seen from FIG. 8 that the encapsulation efficiency of the FITC-BSA in the 4.5×SCPS coating was 81.20±6.42%, which was significantly higher than 21.86±1.90% ($p<0.001$) of the 1×SCPS coating. The 4.5× SCPS groups had such a high FITC-BSA encapsulation efficiency largely due to that a solution volume was reduced and the coating yield was increased.

Although the present disclosure is disclosed above, the present disclosure is not limited thereto. Various changes and modifications may be made by a person skilled in the art without departing from the spirit and scope of the present disclosure. Therefore, the scope of protection of the present disclosure shall be subject to the scope defined in the claims.

The invention claimed is:

1. A preparation method for a biphasic calcium phosphate coating, comprising the following steps:
   (1) immersing a titanium disc into a 5× concentration simulated body fluid (SBF) solution to coat a calcium phosphate (CaP) base layer onto the titanium disc; and
   (2) taking out, drying, and immersing the CaP base layer-coated titanium disc in a supersaturated calcium phosphate solution (SCPS) with a concentration at over 4.5× times supersaturation.

2. The preparation method according to claim 1, wherein the 5×SBF comprises 715 mM of a $Na^+$ ion, 12.5 mM of a $Ca^{2+}$ ion, 7.5 mM of a $Mg^{2+}$ ion, 724.0 mM of a $Cl^-$ ion, 5.0 mM of a $HPO_4^{2-}$ ion, and 21.0 mM of a $HCO^{3-}$ ion.

3. The preparation method according to claim 2, wherein the 5×SBF solution has a pH of 6.0.

4. The preparation method according to claim 1, wherein the 4.5×1 SCPS solution comprises 630 mM of a $Na^+$ ion, 18.0 mM of a $Ca^{2+}$ ion, 184.0828.0 mM of a $Cl^-$ ion, and 9.0 mM of a $HPO_4^{2-}$ ion.

5. The preparation method according to claim 4, wherein the 4.5× SCPS solution has a pH of 6.2.

6. The preparation method according to claim 1, wherein the 5×SBF comprises 715 mM of a $Na^+$ion, 12.5 mM of a Ca2+ion, 7.5 mM of a $Mg^{2+}$ion, 724.0 mM of a $Cl^-$ ion, 5.0 mM of a HPO4$^{2+}$ ion, and 21.0 mM of a $HCO^{3-}$ ion.

7. The preparation method according to claim 6, wherein the 4.5×SCPS solution has a pH of 6.2.

8. The preparation method according to claim 1, wherein in step (2), the CaP base layer-coated titanium disc is taken out, dried, immersed in the 4.5×SCPS solution, and incubated at room temperature for 5 h or more.

9. The preparation method according to claim 2, wherein in step (1), the titanium disc is immersed into the 5×SBF and incubated at 37° C. for 24 h to coat the CaP base layer onto the titanium disc.

10. The preparation method according to claim 1, wherein the titanium disc has a length and a width of 4 mm and a thickness of 1 mm.

11. The preparation method according to claim 6, wherein in step (2), the 4.5×SCPS solution has a volume of 0.1-6 ml.

* * * * *